United States Patent [19]

Ibamoto et al.

[11] Patent Number: 4,945,348
[45] Date of Patent: Jul. 31, 1990

[54] LIQUID CRYSTAL DISPLAY COMBINED WITH SIGNAL INPUT TABLET

[75] Inventors: Masahiko Ibamoto, Katsuta; Satoshi Shimada, Hitachi; Shinji Ohyama, Hitachi; Manabu Sato, Hitachi; Soshiro Kuzunuki, Katsuta; Mitsunari Kano, Seto, all of Japan

[73] Assignee: Hitachi Ltd., Tokyo, Japan

[21] Appl. No.: 183,225

[22] Filed: Apr. 19, 1988

[30] Foreign Application Priority Data

Apr. 22, 1987 [JP] Japan .................................. 62-97362

[51] Int. Cl.⁵ .............................................. G09G 3/18
[52] U.S. Cl. .................................... 340/784; 340/712; 178/18; 350/330
[58] Field of Search ............... 340/707, 712, 784, 805; 178/18, 19; 350/330, 339 D, 334; 358/247, 250

[56] References Cited

U.S. PATENT DOCUMENTS

| | | | |
|---|---|---|---|
| 4,177,354 | 12/1979 | Mathews | 340/707 |
| 4,639,720 | 1/1987 | Rympalski et al. | 340/712 |
| 4,641,354 | 2/1989 | Fukunaga et al. | 178/18 |
| 4,679,909 | 7/1989 | Hamada et al. | 340/707 |
| 4,723,836 | 2/1988 | Kono et al. | 340/707 |
| 4,730,186 | 3/1988 | Koga et al. | 340/712 |
| 4,751,509 | 6/1988 | Kubota et al. | 340/784 |
| 4,794,634 | 12/1988 | Torihata et al. | 340/707 |
| 4,799,050 | 1/1989 | Prince et al. | 340/784 |
| 4,893,398 | 10/1989 | Hubby, Jr. | 178/18 |

*Primary Examiner*—David K. Moore
*Assistant Examiner*—M. Fatahiyar
*Attorney, Agent, or Firm*—Kenyon & Kenyon

[57] ABSTRACT

In a liquid crystal display combined with a signal input tablet of the type which includes a light source, a liquid crystal display disposed on the light source and a transparent tablet for detecting a planar write position by a hand-writing pen which tablet is disposed on the liquid crystal display, the present invention is characterized in that a two-dimensional lens array is disposed as one-to-one erect imaging optical system between the liquid crystal display and the transparent tablet so that the display image of the liquid crystal display is projected as the same size erect image on the surface of the transparent tablet having a light diffusion operation.

14 Claims, 7 Drawing Sheets

(a)

(b)

(c)

LIQUID CRYSTAL DISPLAY COMBINED WITH SIGNAL INPUT TABLET

BACKGROUND OF THE INVENTION

This invention relates to a liquid crystal display combined with a signal input tablet which includes an optical system for parallax compensation and which will be suitable for combining a flat surface display such as a liquid crystal display with an electromagnetic signal input tablet or an ultrasonic signal input tablet.

Conventional liquid crystal displays combined with a signal input tablet have the construction such as shown in FIG. 2. A liquid crystal tablet 2 is disposed on an electromagnetic signal input tablet 1 and data is written by an electromagnetic pen 3 while viewing the displayed characters. It is a customary practice to cover the liquid crystal sheet 2 with protective glass 4 lest it be damaged by writing pressure when the electromagnetic pen 3 rubs the display surface. Particularly when the liquid crystal display is used for a work station or the like, its size is as great as about an A5 size, and thick protective glass 4 must be used lest glass be bent by the writing pressure. In this case, if the character displayed at a point A is viewed, the character is recognized by eyes as if it were displayed at a position B which is somewhat closer to the eyes due to refraction of the glass of the liquid crystal plate and protective glass 4 because the positions of the eyes are slantingly upward at an angle of about 45°. Therefore, if the electromagnetic pen 3 is put to the position B, a position C on the electromagnetic signal input tablet 1 is pointed and a pointing position error corresponding to parallax d develops.

If this error is always constant, this problem can be solved by deviating in advance the electromagnetic signal input tablet 1 by the parallax d. However, the error cannot be corrected accurately because the height of the eyes changes or because the parallax d differs between the central portion and the peripheral portion. In other words, assuming that the height of eyes is h, the horizontal distance from the eyes to the pen tip is l, the thickness from the liquid crystal display 2 to the surface of the protective glass 4 is t and the index of refraction of glass is 1.5, then the parallax d is given by the following formula:

$$d = t \cdot \frac{\sin\theta'}{\cos\theta'} \approx 1.95 \sqrt{\frac{l^2}{1.25 l^2 + 2.25 h^2}} \quad (1)$$

where $\theta'$ is an angle of ray of light outgoing from the display surface to the normal (see FIG. 2). The diagram showing the change of the parallax d when l is changed is put on "No. 31 Information Processing Society of Japan, Report 1N-4". When h=300 mm and l=250 mm, for example, d≈0.9 mm and the error becomes extremely great because resolution of the electromagnetic signal input tablet 1 is 10 line/mm.

The prior art technique described above has no means for compensating for the parallax d and cannot easily and completely pointing position error.

SUMMARY OF THE INVENTION

It is therefore an object of the present invention to provide a display apparatus which eliminates the parallax described above and does not cause the pointing position error.

The object described above can be accomplished by projecting a display picture occurring in the liquid crystal plate 2 to the surface of the protective glass 4 by using one-to-one erect imaging optical system to essentially eliminate the parallax d.

The one-to-one erect imaging optical system forms the image of a certain surface as the same size erect image on another surface. Accordingly, the display image occurring in the liquid crystal is formed as such on the surface of the protective glass 4. Since the image that can be seen from outside is the image that is formed on the surface of the protective glass 4, the parallax does not occur irrespective of the thickness of the protective glass 4 even when viewed askance and the pointing position error can be eliminated.

DETAILED DESCRIPTION OF THE PRESENT INVENTION

Figure 2:
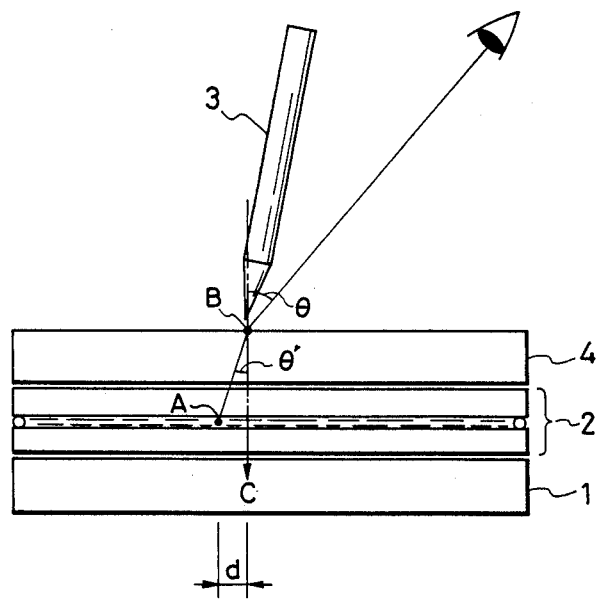
FIG. 2 is a sectional view of a conventional liquid crystal display combined with a signal input tablet.
Figure 3:
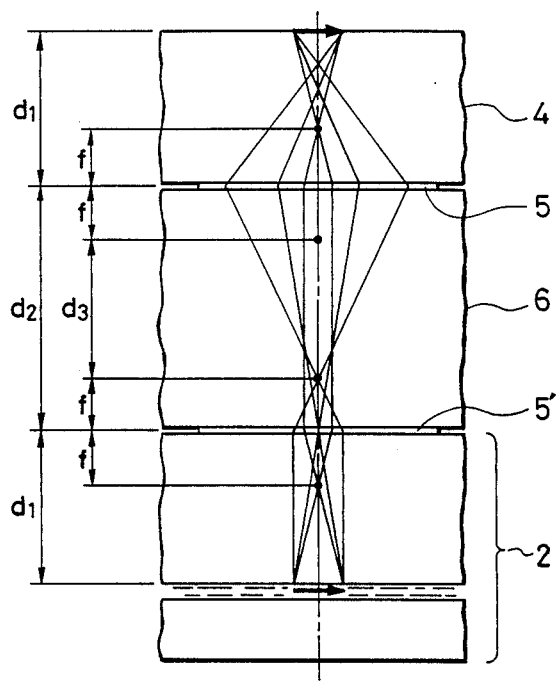
FIG. 3 is an explanatory view useful for explaining the structure of one-to-one erect imaging optical system in the first embodiment of the present invention.

Hereinafter, a first embodiment of the present invention will be described with reference to FIG. 1. The differences of this embodiment from FIG. 2 reside in that the protective glass is divided into two sheets of glass, i.e., protective glass 4 and intermediate glass 6 so as to interpose a microlens array 5 between them, and that a microlens array 5' is also disposed on the upper surface of the liquid crystal display 2. These microlens arrays 5 and 5' are disposed in such a manner that the optical axis of the lens element of each array coincides with that of the other. FIG. 3 shows the pair of microlenses taken out.

It will be hereby assumed that the focal length of the microlenses 5 and 5' in the glass is f, the thickness of the protective glass is $d_1$, the thickness of the intermediate glass 6 is $d_2$ and the thickness of the upper glass on the liquid crystal sheet is $d_1$. Furthermore, it will be assumed that the focal length of the microlenses 5 and 5' is $$d_3 = d_2 - 2f \qquad (2)$$

Then, one-to-one erect imaging optical system can be established under the following condition:

$$d_1 : d_2 = f : d_3 \qquad (3)$$

At this time, the image formed inside the liquid crystal is projected to the surface of the protective glass 4 with the orbit of rays of light such as shown in FIG. 3. The surface of the protective glass 4 is subjected to surface treatment so as to permit easy diffusion of rays of light and the projected image can be seen from all directions. Therefore, even when viewed from slantingly upward, the image can always be seen at the position B in FIG. 1 and since this is immediately above the position A at which the image is formed, the parallax d such as shown in FIG. 2 does not develop.

Figure 4:
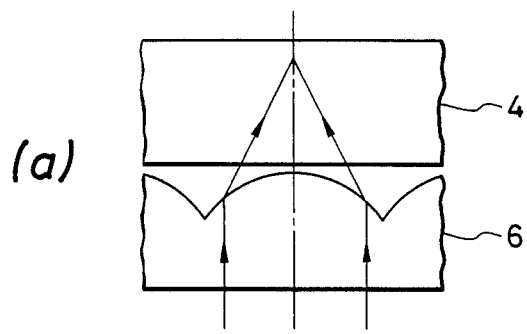
FIG. 4a–4c is a partial sectional views showing the structure of a microlens in the method of the present invention.
Figure 4:
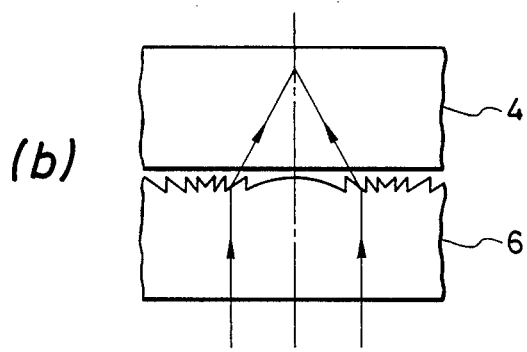
Figure 4:
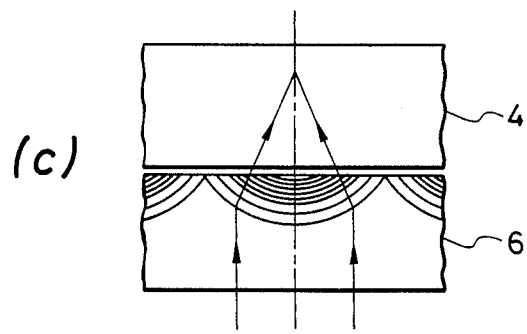

Microlenses 5 and 5' such as shown in FIG. 4 are employed. In FIG. 4(a), the microlens array is engraved into the surface of the intermediate glass 6 and is formed by pressing the glass which is heated and softened by a die or charging molten glass into the die. FIG. 4(b) shows the case where a micro-size Fresnel lens array is formed on the surface of the intermediate glass 6. Since the engraving quantity is small, it can be formed by etching, too. In any of FIGS. 4(a) and 4(b), a limited space is defined between the lens and the protective glass 4 and the rays of light are bent by the difference of indices of refraction of the air layer and the glass in accordance with exactly the same principle as ordinary lenses. In either case, the rays of light leaving the lens immediately enter the protective glass 4 and form the focus inside the protective glass 4. In such a case, the focal length becomes somewhat greater than in the air and the formula (2) can be established, of course, by use of the focal length inside the glass.

FIG. 4(c) shows a graded index type microlens which is formed on the surface of the intermediate glass 6. It can be formed by diffusing metal ions providing a high index of refraction from the surface. The index distribution can form the focus by the arrangement such that the center of each optical axis becomes high or by so-called index distribution of quadric function. In this case, since the surface of the intermediate glass 6 is a flat plane, it can be adhered closely to the protective glass 4. This system does not need the air layer such as shown in FIGS. 4(a) and 4(b) because the index of refraction of the lens portion is higher than that of the glass at the other portions. Incidentally, the method of forming the index distribution is described in the reports of the society meeting of the Institute of Electronics, Information and Communication Engineers, OQE 84–88, p. 39–45, OQE 84–120, p. 37–42, and so forth. The index distribution lens can be formed by laser radiation besides ion implantation and such a method is described in the report of '86 National Convention of Electric Society, p. 220–221, for example.

FIG. 4 shows the cases in all of which the microlens is formed on the surface of the intermediate glass 6. Needless to say, however, the microlens array may be formed on thin glass or a plastic film and be interposed between the protective glass 4 and the intermediate glass 6. Since the lens has the same focal length on the front and reverse thereof, it may be formed, of course, on the reverse of the protective glass 4 instead of forming the microlens on the front surface of the intermediate glass 6. The above holds completely true of the microlens array between the intermediate glass 6 and the liquid crystal display 2. In other words, though FIG. 1 illustrates the case where the microlens is formed on the surface of the liquid crystal display 2, a thin film having formed thereon the microlens array may be interposed between the intermediate glass 6 and the liquid crystal display 2 or the microlens may be formed on the reverse of the intermediate glass 6.

Practically, however, it is preferred to form a pair of microlens arrays on the front and reverse of the intermediate glass 6. This arrangement makes it possible to align the optical axes of the lens pair at the stage of lens formation and their optical axes will not differ from each other. Therefore, the adjustment work of optical axes alignment becomes unnecessary during the assembly of apparatus and the assembly becomes easier as much.

Figure 5:
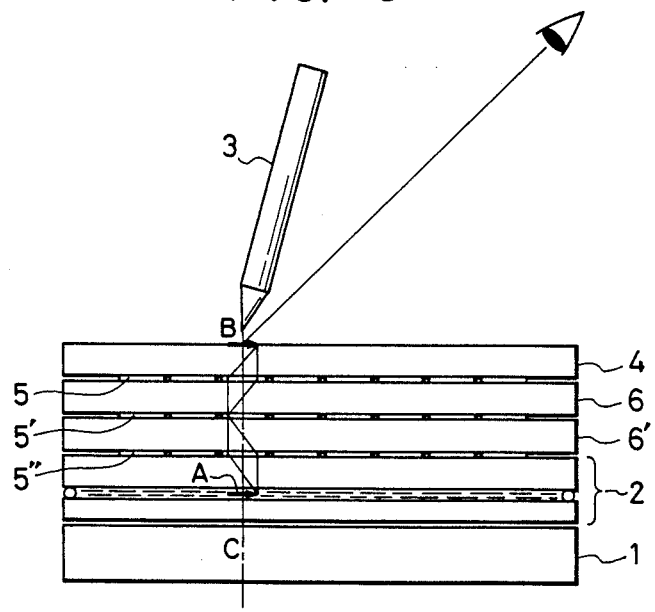
FIG. 5 is a sectional view of a liquid crystal display combined with a signal input tablet in accordance with a second embodiment of the present invention.

Next, a second embodiment of the present invention is shown in FIG. 5.

Figure 1:
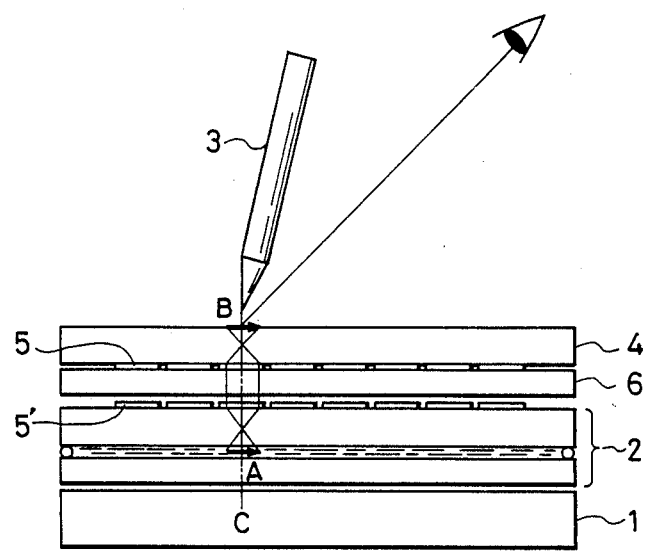
FIG. 1 is a sectional view of a liquid crystal display combined with a signal input tablet in accordance with a first embodiment of the present invention.
Figure 6:
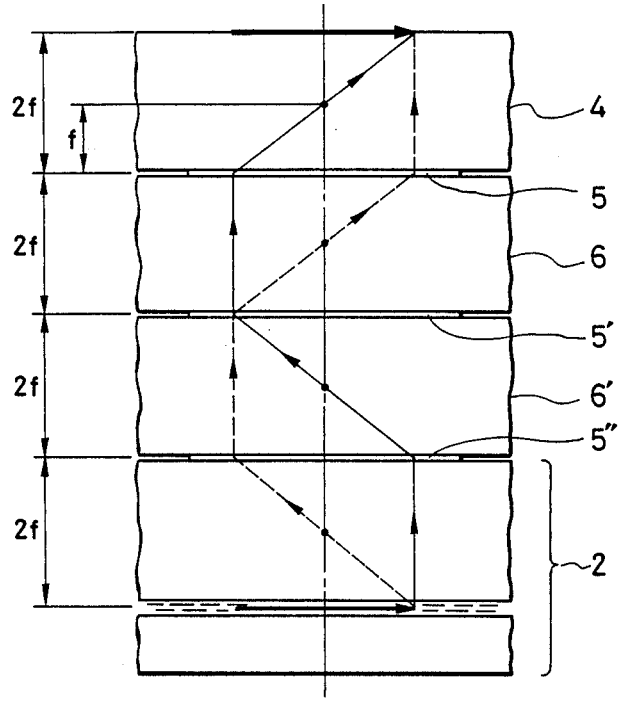
FIG. 6 is an explanatory view useful for explaining the structure of one-to-one erect imaging optical system in the second embodiment of the present invention.

In this drawing, like reference numerals are used to identify like constituents as in FIG. 1. The difference of this embodiment from FIG. 1 lies in that an intermediate glass 6' and a microlens array 5" are disposed. FIG. 6 shows the principle of image formation when one-to-one erect imaging optical system is assembled by such two-stage lenses.

All the microlenses 5, 5', 5" of the three stages have the same focal length f and are disposed with the spacing 2f between them. Needless to say, the focal length f in this case represents the focal length inside the glass. The liquid crystal, too, is spaced apart by 2f from the microlens 5" and of the protective glass 4 is 2f, so that the distance from its surface to the microlens 5 is also 2f. Under such a condition, the ray of light leaving the image displayed in the liquid crystal passes through the route represented by arrow of solid line and arrow of dash line in the drawing and casts the real image of the same size erecting image on the surface of the protective glass 4. The characterizing feature of this one-to-one erect imaging optical system is that the width of the optical path effective for the image information is in agreement with the width of the image and since the rays of light having the full width of the lens can be transmitted, a bright image can be obtained. Since the number of rays of light travelling towards the neighboring lens is small, the rays of light reaching the portions other than the image decrease on the surface of the protective glass 4 and an image having high contrast can be obtained by preventing the image from becoming white as a whole.

Accordingly, this system can provide a more distinctive image than the system shown in FIG. 1 and the fatigue of eyes can be reduced.

In all the foregoing embodiments, the protective glass and the liquid crystal display are all made of glass, but a transparent plastic can of course be used practically sufficiently for at least part of the material.

Figure 7:
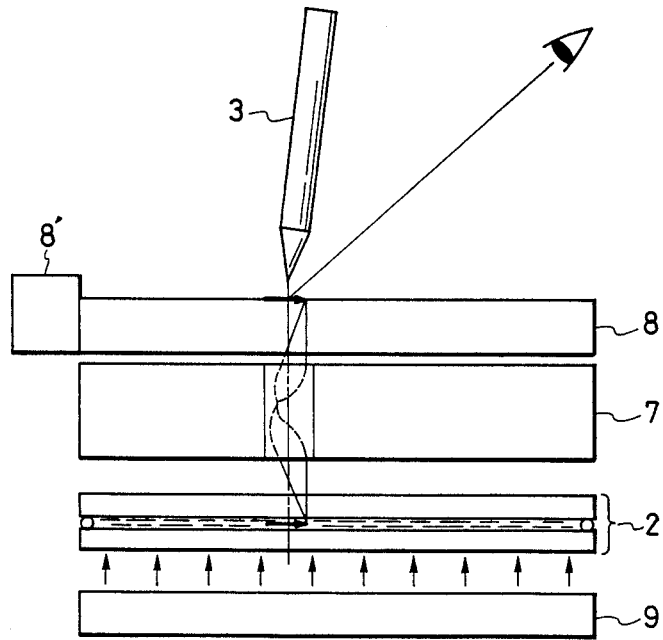
FIG. 7 is a sectional view of a liquid crystal display combined with, a, signal input tablet in accordance with a third embodiment of the present invention.

Next, FIG. 7 shows a third embodiment of the present invention, wherein like reference numerals are used to identify like constituents as in FIG. 1. A one-to-one erect imaging optical system comprising a rod lens array 7 is disposed on the liquid crystal display. A transparent electromagnetic signal input tablet 8 formed by disposing transparent wirings on the reverse of transparent glass is disposed on this optical system. Incidentally, a detection circuit portion 8' of the transparent electromagnetic signal input tablet 8 is disposed in the periphery of the apparatus.

The liquid crystal display 2 is of a transmission type and a light source 9 is disposed on its back side. Generally, a fluorescent lamp is used as the light source but it may be a surface light emitting member such as an LED array or an electroluminescence plate.

In the structure described above, when the image is displayed by the liquid crystal display 2, the image is projected on the surface of the transparent electromagnetic signal input tablet 8 by the rays of light from the light source 9. Since a light diffusion layer of a dark color system is formed on the surface of the transparent electromagnetic signal input tablet 8, reflection of external light or reflection of a ceiling lamp does not occur and only the display image can be seen clearly with a high contrast. The image can be seen clearly in the same way from all directions. Thus, this system provides the effects that the image can be seen easily and the eyes does not get tired.

Since the transparent electromagnetic signal input tablet 8 exists on the surface in the structure shown in FIG. 7, there can be obtained the advantage that the position detection accuracy of the electromagnetic pen 3 can be improved. Furthermore, though it is necessary to limit the total thickness of the liquid crystal display 2, the protective glass 4 and the intermediate glass 6 to about 10 mm or less from the aspect of sensitivity of the electromagnetic signal input tablet 1 of the preceding drawing figures the embodiment shown in FIG. 7 is free from such a limitation and design freedom of the one-to-one erect imaging optical system can be further improved.

Since the tablet exists on the surface in the structure shown in FIG. 7, a ultrasonic signal input tablet can be used in place of the electromagnetic signal input tablet. In other words, exactly the same function can be obtained by disposing a ultrasonic sensor around the transparent glass sheet and by using a transparent ultrasonic tablet for writing data by a ultrasonic pen.

Next, a fourth embodiment of the present invention will be described with reference to FIG. 8, wherein like reference numerals are used to identify like constituents as in FIG. 1. The intermediate glass 6 equipped on its both surfaces with the microlens arrays is disposed on the liquid crystal display 2 to form the one-to-one erect imaging optical system. The transparent electromagnetic signal input tablet 8 formed by applying transparent wirings to the back of glass is disposed on this optical system.

Incidentally, the detection circuit portion 8' of the transparent electromagnetic signal input tablet 8 is disposed at the peripheral portion of the apparatus.

The liquid crystal display 2 is of the transmission type and the light source 9 is disposed on its reverse surface. Generally, a fluorescent lamp is used as the light source 9 but it is possible to use a surface light emitting member such as an LED array or an electroluminescence plate.

When the image is displayed by the liquid crystal display in the structure described above, the image is cast on the front surface of the transparent electromagnetic signal input tablet 8 by the rays of light from the light source 9. Since the diffusion layer of the dark color system is formed on the surface of the transparent electromagnetic signal input tablet 8, the image can be seen without any reflection of external light but with a high contrast in the same way as in the third embodiment. The tablet has high detection accuracy and either the electromagnetic tablet or the ultrasonic tablet can be used in exactly the same way as in the third embodiment. Furthermore, this system provides the advantage that the total thickness can be further reduced when compared with the third embodiment because the focal length of the microlens 5, 5' is generally smaller than that of the rod lens and the optical length is smaller.

Figure 8:
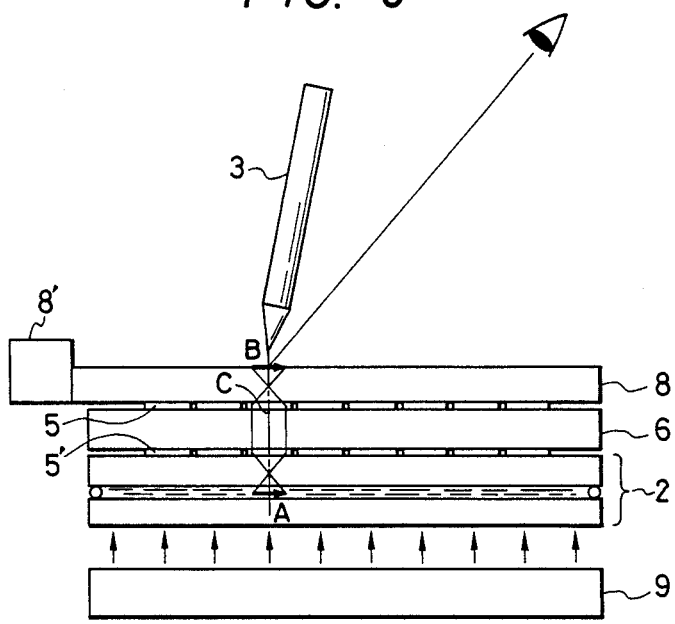
FIG. 8 is a sectional view of a liquid crystal display combined with a signal input tablet in accordance with a fourth embodiment of the present invention.
Figure 9:
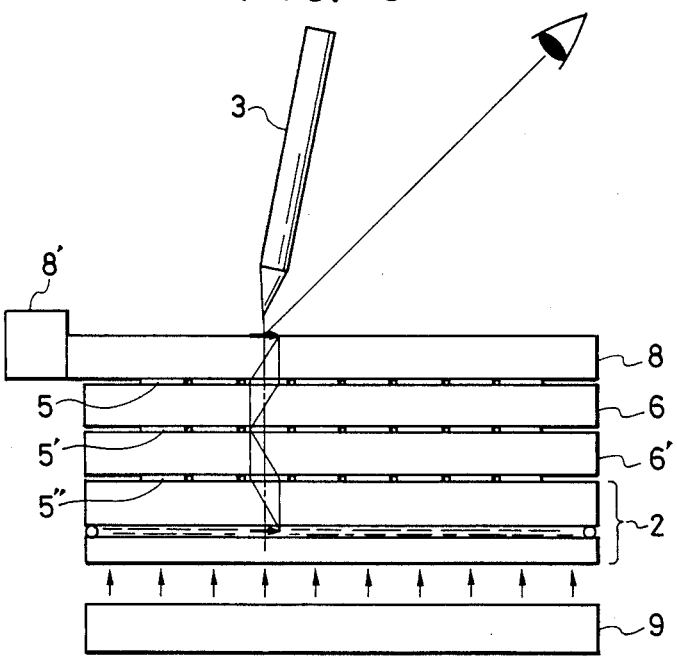
FIG. 9 is a sectional view of a liquid crystal display combined with a signal input tablet in accordance with a fifth embodiment of the present invention.

FIG. 9 shows a fifth embodiment of the present invention, wherein like reference numerals are used to identify like constituents as in FIGS. 1, 5 and 8. The one-to-one erect imaging optical system of the three-stage microlens array system is placed on the liquid crystal display 2 and the transparent electromagnetic signal input tablet 8 shown in FIGS. 7 and 8 is placed on the optical system. The display image formed in the liquid crystal display 2 receives the rays of light of the light source 9 and forms the same size errect image on the surface of the transparent electromagnetic signal input tablet 2 while describing the orbit of rays of light shown in the drawings through the microlens arrays 5, 5', 5''. Since the light diffusion layer of a dark color system is formed on the surface of the transparent electromagnetic signal input tablet 8, the image can be seen clearly with a high contrast but without any reflection of external light. On the ground that the second embodiment provides the better contrast than the first embodiment, this embodiment provides the image having better contrast than the fourth embodiment. The other features such as the detection accuracy of the tablet, the reduction of the optical length than the rod lens, and so forth, are the same as those of the fourth embodiment.

Figure 10:
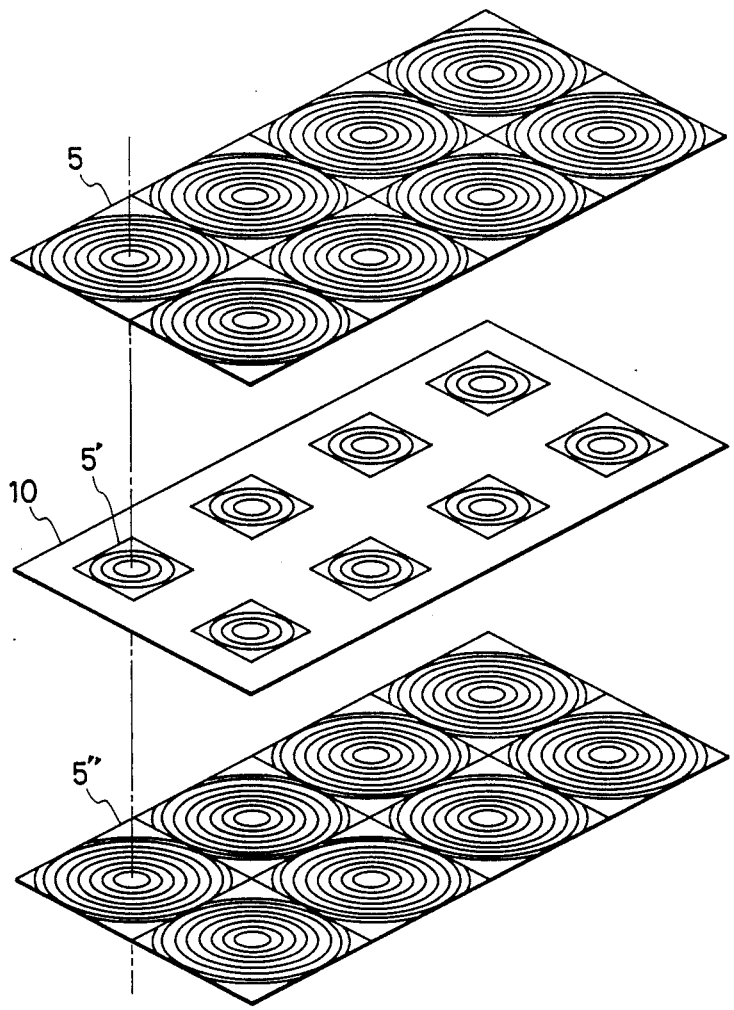
FIG. 10 is a perspective view showing the structure of a microlens array and a mask in a sixth embodiment of the present invention.
Figure 11:
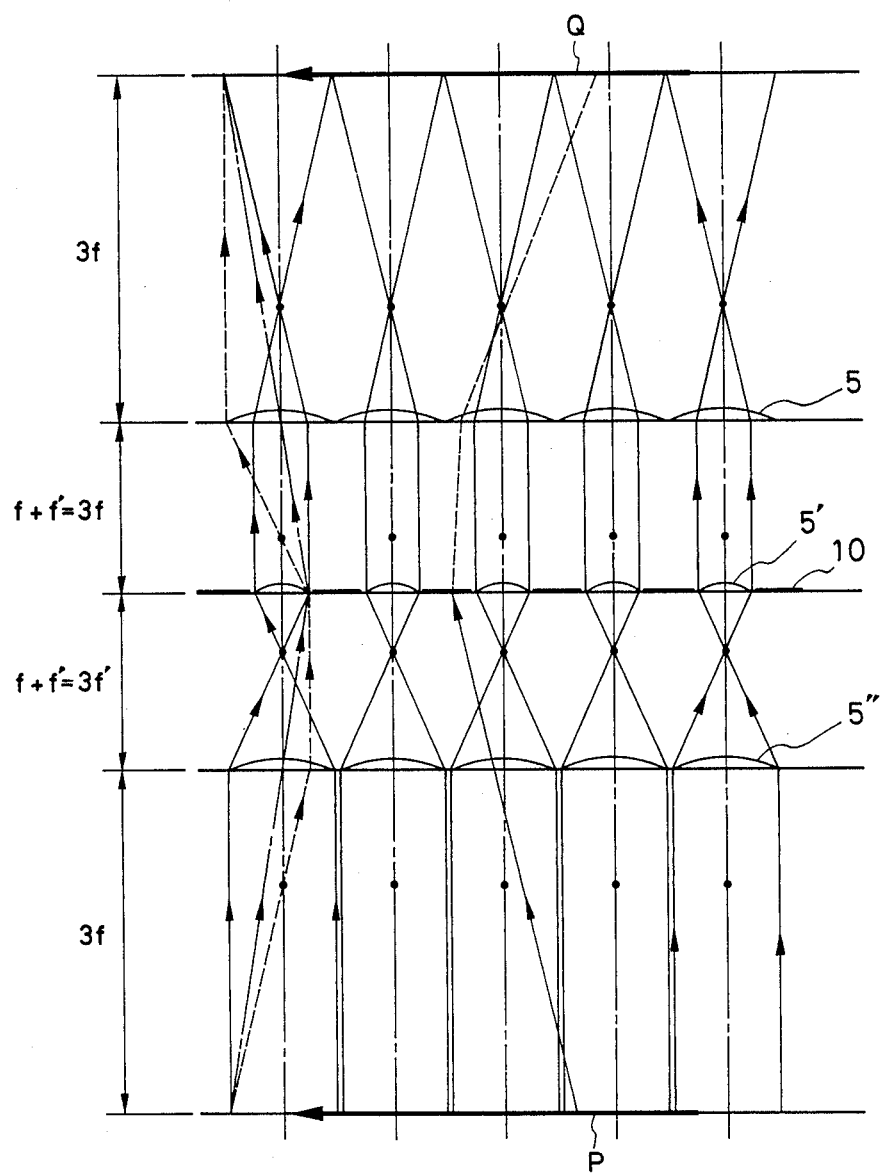
FIG. 11 is an explanatory view useful for explaining the principle of image formation of the one-to-one erect imaging optical system in the sixth embodiment of the present invention.

Next, the sixth embodiment of the present invention will be described with reference to FIG. 10. Though the structure is exactly the same as that of FIG. 9, this embodiment is different in that the focal length of the intermediate microlens array 5' is smaller. FIG. 11 shows the principle of image formation when, for example, the focal length f' of the intermediate microlens array 5' is set to the half of the focal length f of the upper and lower microlens arrays 5 and 5''. Though the same size erect image can be formed in this case, too, the positions of the original image and image formation are remoter than in FIG. 6 and are at the positions of three times of the focal length f of the upper and lower lenses 5 and 5''. In this case, the diameter of the intermediate lens 5' may be half of the diameter of the upper and lower lenses 5 and 5''. Therefore, the intermediate microlens array 5' may have a structure such as shown in FIG. 10 by covering its unnecessary portions by an opaque mask 10.

According to the structure described above, the rays of light which are not relevant to image formation such as the rays of light travelling slantingly from the point P travel as represented by solid line arrow in the drawing but are cut off by the mask 10. If the size of the intermediate lens 5' is the same as that of the upper and lower lenses, the rays of light leaving the point P travel as represented by dash line and reach the point Q. Since these rays of light do not contribute to image information, they illuminate the image formation surface as a whole and reduce the contrast. Therefore, when the mask 10 is disposed, the contrast can be more improved than the fifth embodiment and a brighter image can be obtained. The other features of this embodiment are the same as those of the fifth embodiment.

In accordance with the present invention, the character or image displayed by the liquid crystal display 2 can be seen at the correct position without any adverse influence of parallax due to the protective glass 4. Therefore, the pointing position by the electromagnetic pen 3 does not deviate so that the pointing position error can be reduced and business efficiency can be improved.

What is claimed is:

1. In a liquid crystal display combined with a signal imput tablet comprising a tablet for detecting a planar write position by a hand-writing input pen, a liquid crystal display disposed on said table and a transparent protective plate disposed on said liquid crystal display and having a light diffusion operation, the improvement comprising a two-dimensional lens array disposed as one-to-one erect imaging optical system between said liquid crystal display and said transparent protective plate so that the display image can be projected as the same size erect image on the surface of said transparent protective plate thereby elementating parallax otherwise existing between the liquid crystal display and the input panel.

2. A liquid crystal display combined with a signal input tablet according to claim 1, wherein two stages of two-dimensional microlens arrays are used as said one-to-one erect imaging optical system.

3. A liquid crystal display combined with a signal input tablet according to claim 1, wherein said two stages of microlens arrays are formed integrally on the front and reverse of said transparent protective plate.

4. A liquid crystal display combined with a signal input tablet according to claim 2, wherein one stage of said two stages of microlens arrays is formed integrally on the reverse of said transparent protective plate while the other is formed integrally on the front surface of said liquid crystal display.

5. A liquid crystal display combined with a signal input tablet according to claim 1, wherein three stages of two-dimensional microlens arrays are used as said one-to-one erect imaging optical system.

6. A liquid crystal display combined with a signal input tablet according to claim 5, wherein two stages of said three stages of two-dimensional microlens arrays are formed integrally on the front and reverse- of one transparent plate.

7. In a liquid crystal display combined with a signal imput tablet comprising a light source, a crystsl display disposed on said light source and a transparent tablet for detecting a planar write position by a hand-writing pen, disposed on said liquid crystal display, the improvement comprising a two-dimensional lens array dispoded as one-to-one erect imaging optical system between said liquid crystal display and said transparent tablet so that the display image of said liquid crystal display is projected as the same size erect image on the surface of said transparent tablet having a light diffusion operation thereby eliminating parallax otherwise existing between the liquid crystal and the input panel.

8. A liquid crystal display combined with a signal input tablet according to claim 7, wherein two stages of two-dimensional microlens arrays are used as said one-to-one erect imaging optical system.

9. A liquid crystal display combined with a signal input tablet according to claim 8, wherein said two stages of two-dimensional microlens arrays are formed integrally on the front and reverse of a transparent plate.

10. A liquid crystal display combined with a signal input tablet according to claim 8, wherein one stage of said two stages of two-dimensional microlens arrays is formed integrally on the reverse of said transparent tablet while the other is formed integrally on the front surface of said liquid crystal display.

11. A liquid crystal display combined with a signal input tablet according to claim 7, wherein three stages of two-dimensional microlens arrays are used as said one-to-one erect imaging optical system.

12. A liquid crystal display combined with a signal input tablet according to claim 11, wherein two stages of said three stages of two-dimensional microlens arrays are formed integrally on the front and reverse of one transparent plate.

13. A liquid crystal display combined with a signal input tablet according to claim 7, wherein a two-dimensional rod lens array is used as said one-to-one erect imaging optical system.

14. A liquid crystal display combined with a signal input tablet according to claim 11, wherein the focal length and diameter of each lens of the intermediate two-dimensional microlens array among said three stages of two-dimensional microlens arrays are smaller than those of the lenses of the other two-dimensional microlens arrays and the spacing between the individual lenses is buried by a shading mask.

* * * * *

UNITED STATES PATENT AND TRADEMARK OFFICE
CERTIFICATE OF CORRECTION

PATENT NO. : 4,945,348
DATED : 31 July 1990
INVENTOR(S) : Masahiko IBAMOTO et al.

It is certified that error appears in the above-identified patent and that said Letters Patent is hereby corrected as shown below:

| Column | Line | |
|---|---|---|
| 1 | 64 | After "completely" insert --solve the--. |
| 2 | 6 | After "using" insert --a--. |
| 2 | 27 | Before "one-to-one" insert --a--. |
| 2 | 29 | Change "Fig. 4a - 4c is a" to --Figs. 4a-4c are-- |
| 2 | 36 | Before "one-to-one" insert --a--. |
| 2 | 39 | Change "with , a," to --with a--. |
| 3 | 11 | After "Then" delete comma and insert --a- |
| 4 | 24 | After "becomes" insert --much--; After "easier" delete "as". |
| 4 | 25 | Delete "much". |
| 4 | 32 | After "when" insert --a--. |
| 4 | 40 | After "and" insert --the thickness--. |
| 4 | 64 | After "used" delete "practically" and insert --instead--. |
| 4 | 65 | Delete "sufficiently". |
| 5 | 26 | Change "does" to --do--. |
| 5 | 36 | After "figures" insert --,--. |

UNITED STATES PATENT AND TRADEMARK OFFICE
CERTIFICATE OF CORRECTION

PATENT NO. : 4,945,348
DATED : 31 July 1990
INVENTOR(S) : Masahiko IBAMOTO et al.

It is certified that error appears in the above-identified patent and that said Letters Patent is hereby corrected as shown below:

| Column | Line | |
|---|---|---|
| 5 | 41 | Before "ultrasonic" change "a" to --an--. |
| 5 | 44 | Before "ultrasonic" change "a" to --an--. |
| 5 | 46 | Before "ultrasonic" change "a" to --an--. |
| 5 | 50 | Delete "its". |
| 5 | 51 | After "both" insert --its--. |
| 6 | 31 | Change "ground" to --grounds--. |
| 6 | 36 | After "optical length" insert --because of the length of the microlens 5, 5' being generally smaller--; after "than" insert --that of--. |
| 6 | 45 | Before "half" delete "the". |
| 6 | 60 | Before "solid" insert --a--. |
| 6 | 64 | Before "dash" insert --a--. |

UNITED STATES PATENT AND TRADEMARK OFFICE
CERTIFICATE OF CORRECTION

PATENT NO. : 4,945,348

DATED : July 31, 1990

INVENTOR(S) : Masahiko Ibamoto, et al.

It is certified that error appears in the above-identified patent and that said Letters Patent is hereby corrected as shown below:

| Column | Line | |
|--------|------|---|
| 7 | 25 | Change "elementating" to --eliminating--. |
| 7 | 49 | Change "reverse-" to --reverse--. |
| 8 | 2 | Before "crystal" insert --liquid--. |
| 8 | 6 | Change "dispoded" to --disposed--. |

Signed and Sealed this

Twenty-eighth Day of April, 1992

Attest:

HARRY F. MANBECK, JR.

*Attesting Officer*  *Commissioner of Patents and Trademarks*